(12) United States Patent
Tanaka et al.

(10) Patent No.: US 7,320,900 B2
(45) Date of Patent: Jan. 22, 2008

(54) METHOD OF MANUFACTURING LIQUID CRYSTAL DISPLAY PANELS

(75) Inventors: Yoshinori Tanaka, Kawasaki (JP); Yoshiaki Maruyama, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 456 days.

(21) Appl. No.: 10/372,609

(22) Filed: Feb. 19, 2003

(65) Prior Publication Data

US 2003/0162317 A1    Aug. 28, 2003

(30) Foreign Application Priority Data

Feb. 22, 2002    (JP)    ............................. 2002-047185

(51) Int. Cl.
  *H01L 21/00*    (2006.01)
(52) U.S. Cl. ................... 438/48; 257/E21.587
(58) Field of Classification Search ................ 438/149, 438/30, 48, 128, 151; 349/156, 151, 118; 257/E21.587, E21.347, E21.208
See application file for complete search history.

(56) References Cited

U.S. PATENT DOCUMENTS

| | | | |
|---|---|---|---|
| 6,001,203 A * | 12/1999 | Yamada et al. | 156/106 |
| 6,256,082 B1 | 7/2001 | Suzuki et al. | |
| 6,466,293 B1 | 10/2002 | Suzuki et al. | |
| 6,724,458 B2 * | 4/2004 | Kim et al. | 349/156 |
| 6,922,222 B2 * | 7/2005 | Miyachi et al. | 349/118 |
| 2002/0018173 A1 | 2/2002 | Furukawa et al. | |

FOREIGN PATENT DOCUMENTS

| | | |
|---|---|---|
| JP | 05-341246 | 12/1993 |
| JP | 5-341246 | 12/1993 |
| JP | 8-095009 | 4/1996 |
| JP | 9-281515 | 10/1997 |
| JP | 11-295739 | 10/1999 |
| JP | 2002-23128 | 1/2002 |

* cited by examiner

*Primary Examiner*—Howard Weiss
*Assistant Examiner*—(Vikki) Hoa B Trinh
(74) *Attorney, Agent, or Firm*—Greer, Burns & Crain, Ltd.

(57) ABSTRACT

Before cutting a gang-printed substrate having a multiplicity of liquid crystal display panel regions provided thereon into individual liquid crystal display panels, a voltage is applied to all of the multiplicity of liquid crystal display panel regions to inspect display defects, polymerize a monomer in the liquid crystal component, and control alignment of the liquid crystal, which allows the time required for a voltage applying step to be reduced and allows a reduction in the manufacturing cost. A dispenser injection process is used to allow a liquid crystal to be injected between mother boards that have not been cut into individual display panels, and a voltage is applied after the pair of glass substrates are combined and before they are cut into individual display panels to perform a test on display defects (dynamic operating test), pretilt control, and an aligning process.

20 Claims, 13 Drawing Sheets

STEP OF FORMING CELLS ACCORDING TO
VACUUM INJECTION METHOD OF THE RELATED ART

FIG. 14 (PRIOR ART)

METHOD OF MANUFACTURING LIQUID CRYSTAL DISPLAY PANELS

BACKGROUND OF THE INVENTION

1. Field of the Invention

The present invention relates to a method of manufacturing liquid crystal display panels (LCD panels) in which a multiplicity of liquid crystal display panels are cut and manufactured from a single glass substrate (mother glass) on a gang printing basis.

2. Description of the Related Art

Figure 13:
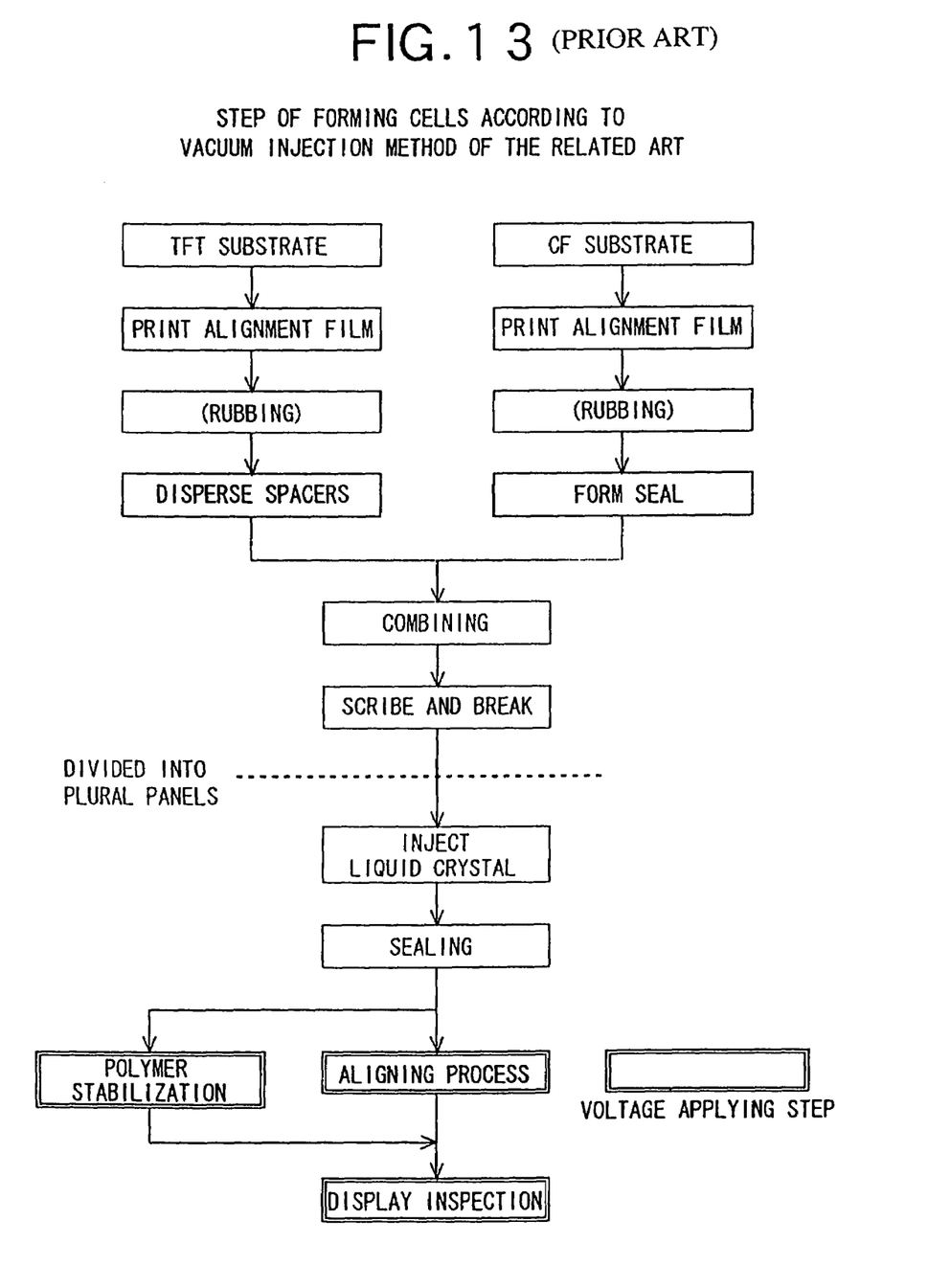
FIG. 13 is a flowchart for a method of manufacturing liquid crystal display panels according to the related art utilizing a vacuum injection process.

FIG. 13 shows a flow of steps for manufacturing liquid crystal display panels according to the related art utilizing a vacuum injection process. Among the steps for manufacturing liquid crystal display panel, the vacuum injection process is used for sealing a liquid crystal between two glass substrates facing each other by combining the two glass substrates having pixel electrodes, or a common electrode and various lines formed thereon with a predetermined gap left therebetween and injecting the liquid crystal in the gap through an opening provided at a combined end section in a vacuum atmosphere.

In the case of multi-shot in which a plurality of LCD panels is cut from a single glass substrate, as shown in FIG. 13, a substrate to serve as TFT substrates having a plurality of TFT substrate regions formed thereon is first combined with a substrate to serve as CF substrates having a plurality of CF substrate regions formed in association with the TFT substrate regions. Next, the combined substrates are broken along predetermined scribe lines to be cut into individual liquid crystal display panels into which a liquid crystal is injected utilizing capillarity in a vacuum chamber.

Figure 14:
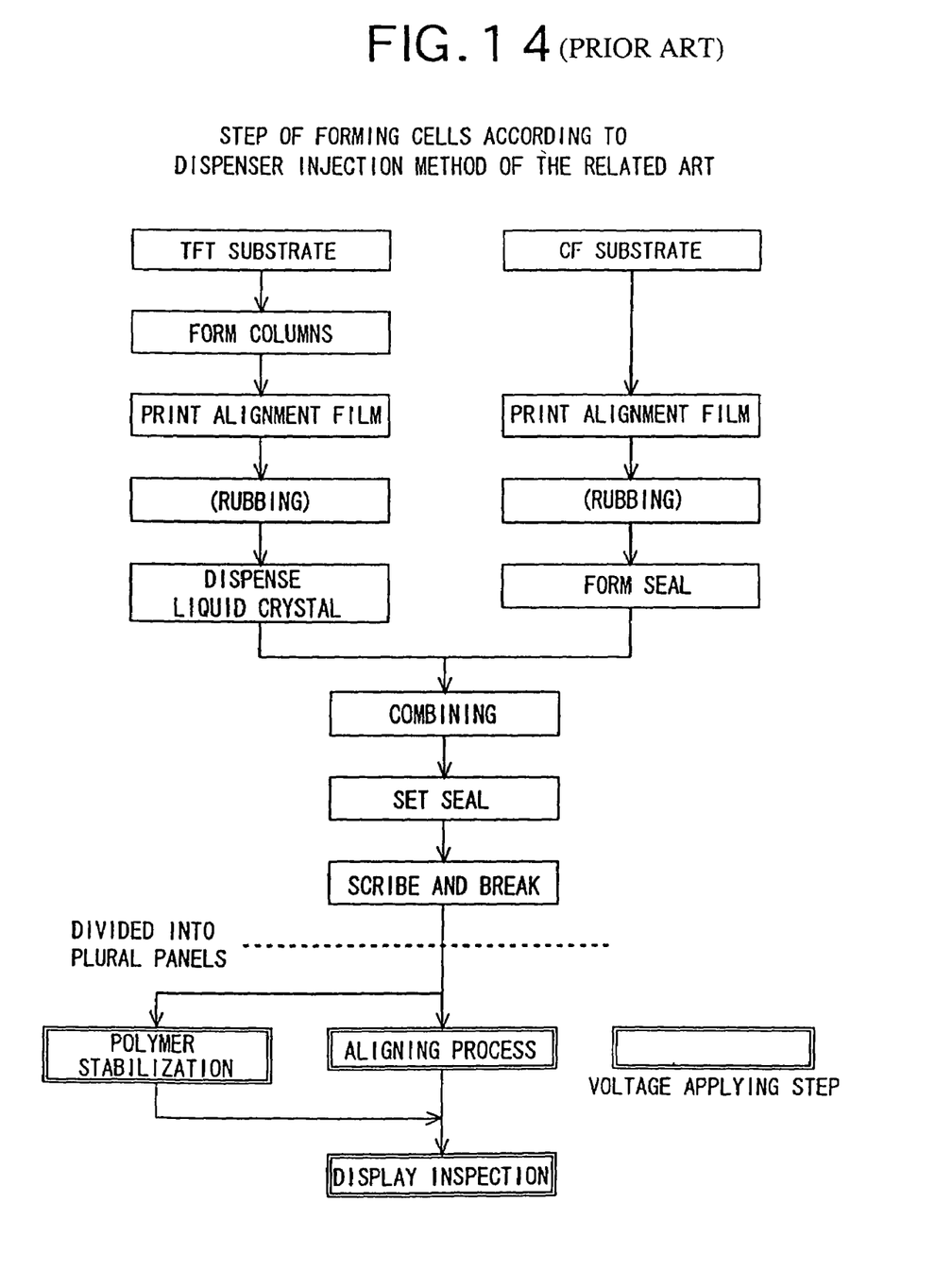
FIG. 14 is a flow chart for a method of manufacturing liquid crystal display panels according to the related art utilizing a dispenser injection process.

Recent techniques for manufacturing LCD panels that have been put in use include a dispenser injection process in which a liquid crystal is dispensed on each of TFT substrate regions on a gang-printed glass substrate (e.g., a substrate to serve as TFT substrates) and in which the substrate is then combined with a substrate to serve as CF substrates to seal the liquid crystal. FIG. 14 shows a flow of steps for manufacturing liquid crystal display panels according to the related art utilizing the dispenser injection process. Pillar spacers for maintaining a cell gap are formed in each of TFT substrate regions on a gang-printed substrate to serve as TFT substrates. A rubbing process is performed when needed after printing an alignment film. Then, a liquid crystal is dispensed in each of the TFT substrate regions while controlling the quantity of the droplet.

Each of CF substrate regions on a gang-printed substrate to serve as CF substrates is subjected to a rubbing process when needed after printing an alignment film on the same, and a sealing material that is set when irradiated with ultraviolet (UV) rays is applied around each of the CF substrate regions. The substrate to serve as CF substrates is laid on the substrate to serve as TFT substrates in alignment with the same, and the two mother glasses are combined by irradiating the sealing material with ultraviolet rays to set the same. Thus, the dispenser injection process is advantageous in that panels can be fabricated in a very short time compared to the vacuum injection process in which a long time is required for sealing a liquid crystal. The dispenser injection process completes the injection of a liquid crystal on mother glasses unlike the vacuum injection process in which a liquid crystal is injected after individual liquid crystal display panels are cut from mother glasses.

Some of steps for forming liquid crystal display panel cells involve an operation of applying a voltage after a liquid crystal is injected. FIGS. 13 and 14 indicate such steps involving the application of a voltage with hatching.

An operation of applying a voltage that is normally performed after the injection of a liquid crystal is a panel test step in which each cell is judged good or not by turning it on before a module step at which driver ICs are mounted using TAB (tape-automated bonding). In the case of gang printing in which a plurality of panel layouts can be provided on a mother glass, an inspection of display defects of each liquid crystal display panel is performed by separately applying a predetermined voltage to each liquid crystal display panel to inspect whether the pixels are properly turned on and off after cutting each liquid crystal display panel from the mother glass.

In addition to the above-described inspection of display defects, there are two processes at which a voltage is applied to a liquid crystal display panel as described below. The first process is performed when using a method of stabilizing alignment of a liquid crystal in which a liquid crystal material including a monomer is used and in which the monomer is polymerized to stabilize the alignment of the liquid crystal. According to the method of stabilizing alignment of a liquid crystal using a polymer, for example, a vertically aligned liquid crystal (VA liquid crystal) having negative dielectric constant anisotropy is added with a monomer that is polymerized by irradiating the same with ultraviolet rays. Next, the monomer is polymerized by irradiating the same with ultraviolet rays while applying a predetermined voltage to the liquid crystal after sealing the liquid crystal between two substrates. A pretilt angle of the liquid crystal is controlled by the polymer. The pretilt angle of the liquid crystal depends on the magnitude of the voltage applied to the liquid crystal, for example.

The other process involving application of a voltage is performed when a ferroelectric liquid crystal is used. A voltage must be applied to a ferroelectric liquid crystal while it is heated in order to achieve uniform orientation of alignment. When a liquid crystal material exhibiting a series of phase transitions expressed by ISO→N*→SmC*, a domain having inverted spontaneous polarization is normally formed in the SmC* phase. While uniform alignment cannot be achieved throughout the liquid crystal because of the domain, uniform alignment can be achieved by applying a DC bias to the liquid crystal in the vicinity of the N* → SmC* transition. Therefore, when a ferroelectric liquid crystal is sealed between substrates, there must be a process at which a voltage is applied with the temperature of the liquid crystal increased to the point of the phase transition.

At those voltage applying processes, a terminal section for applying a voltage to an LCD panel must be exposed. Therefore, in the case of gang printing in which a plurality of panel regions are provided on a mother glass, the mother glass is cut into individual liquid crystal display panels to which a voltage is applied separately.

In the case of a gang-printed product, the number of panels obtained from a single mother glass can range from several pieces to several tens pieces or more. Therefore, when an operation of applying a voltage to individual liquid crystal display panels is performed after cutting the individual liquid crystal display panels from a mother glass as shown in FIGS. 13 and 14, an operation of transporting the multiplicity of liquid crystal display panels to and from an inspection apparatus becomes complicated. Thus, the voltage applying process takes a long time to result in the problem of an increase in the manufacturing cost. Further, since the voltage applying operation itself increases the number of manufacturing steps, it can reduce production efficiency.

SUMMARY OF THE INVENTION

The invention provides a method of manufacturing liquid crystal display panels which makes it possible to suppress any increase in the manufacturing cost and to improve production efficiency.

In order to solve the above-described problems, a method of manufacturing liquid crystal display panels according to the invention is characterized in that it has the steps of using a dispenser injection process that allows a liquid crystal to be injected between two mother glasses before they are cut into individual LCD panels, and performing a voltage applying process after the mother glasses are combined and before the glasses are cut into individual LCD panels, thereby performing a test on display defects (dynamic operation test) and a pretilt control process or aligning process that are required for a process of forming LCD panel cells.

In order to allow the voltage to be applied with the two mother glasses combined together, an electrode terminal surface to be used for the voltage applying process is exposed using any of a method (1) in which the mother glasses that are in different sizes are combined, a method (2) in which the mother glasses that are in the same size are combined with an offset between them, and a method (3) in which only one of the mother glasses that are in the same size is cut after combining the mother glasses, which makes it possible to apply the required voltage through probing, TAB, or COG packaging.

In order to facilitate the application of the voltage, the electrode pattern electrically connects an electrode in each of a plurality of liquid crystal display panel regions provided on the mother glasses to each other to allow the voltage to be applied in a particular location.

According to the method of manufacturing liquid crystal display panels of the invention, at the process of forming a plurality of panels, the voltage can be applied to all of the LCD panel regions when the mother glasses are combined are have not been divided into individual liquid crystal display panels yet, which makes it possible to inspect display defects on the LCD panels, to perform a liquid crystal alignment stabilizing step utilizing a polymer or control the alignment with a simple apparatus.

DESCRIPTION OF THE PREFERRED EMBODIMENT

Figure 1:
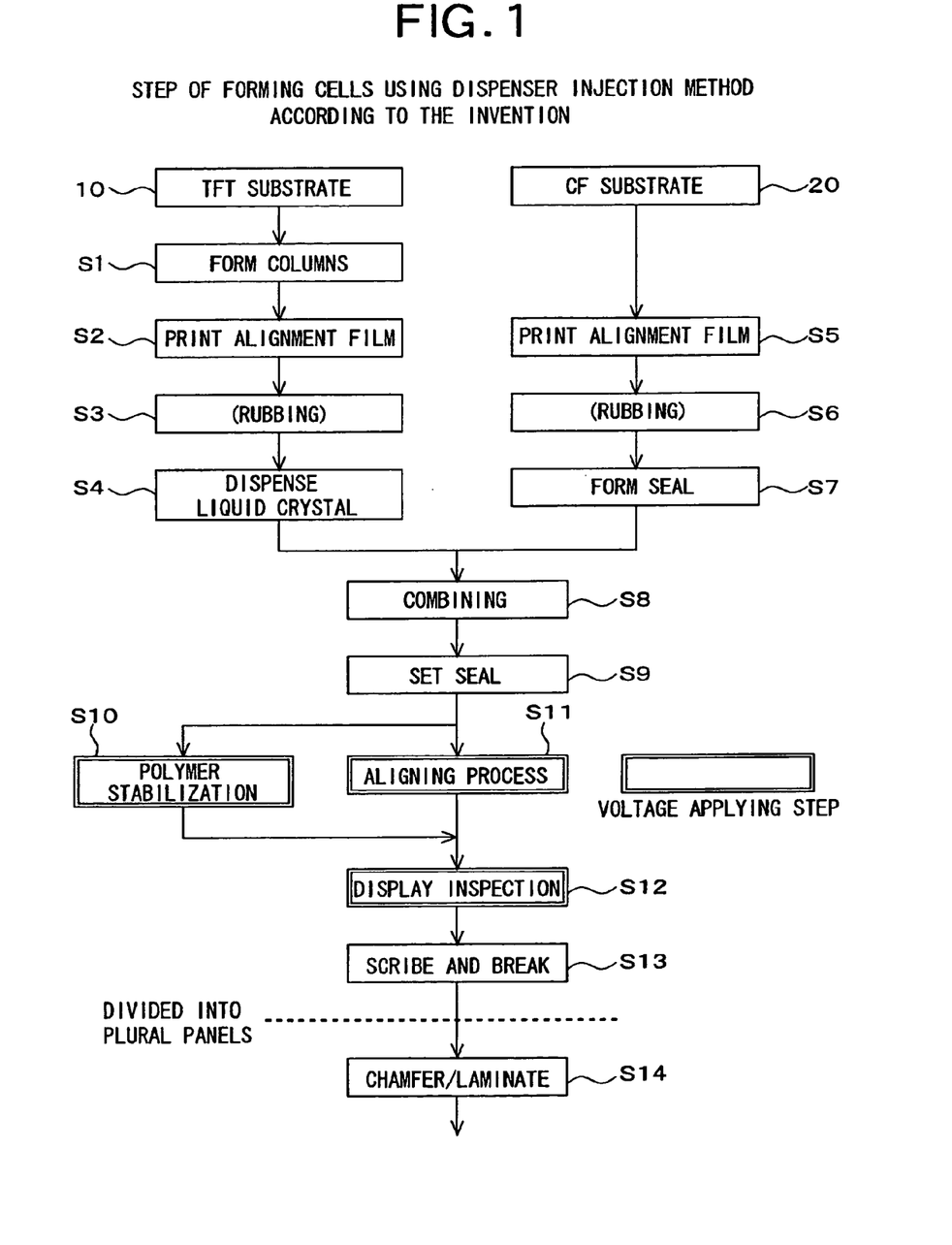
FIG. 1 is a flow chart for a method of manufacturing liquid crystal display panels according to an embodiment of the invention.

A method of manufacturing liquid crystal display panels according to an embodiment of the invention will now be described with reference to FIGS. 1 and 2. FIG. 1 is a flow chart showing steps of the method of manufacturing liquid crystal display panels in the present embodiment of the invention. For example, a glass substrate that is a transparent insulated substrate is used as a substrate 10 to serve as TFT substrates (a mother glass for TFT substrates) in FIG. 1. A multiplicity of TFT substrate regions are formed on the substrate 10 to serve as TFT substrates. A plurality of scan bus lines and a plurality of signal bus lines are provided in each of the TFT substrate regions such that they intersect each other with an insulation film interposed therebetween.

A TFT (thin film transistor), a pixel electrode, and a storage capacitor electrode are formed in each of pixel regions which are defined by the bus lines. The TFTs function as switching elements for applying a gray scale voltage to the pixel electrode at each pixel.

For example, a glass substrate that is a transparent insulated substrate is used as a substrate 20 to serve as CF substrates (a mother glass for CF substrates) in FIG. 1. A multiplicity of CF substrate (opposite substrate) regions are formed on the substrate 20 to serve as CF substrates. In each of the CF substrate regions, a common electrode and color filters (CFs) are formed opposite to the pixel electrode formed on the respective TFT substrate.

As shown in FIG. 1, according to the method of manufacturing liquid crystal display panels in the present embodiment, pillar spacers are formed in each of the TFT substrate regions on the substrate 10 to serve as TFT substrates (step S1). For example, an alignment film made of polyimide is then formed in each of the TFT substrate regions using a printing process (step S2), and a rubbing process is performed on the same if necessary (step S3). Next, a liquid crystal in a predetermined amount is dispensed on each of the TFT substrate regions on the substrate 10 for TFT substrates using a dispenser injection process (step S4).

For example, an alignment film made of polyimide is also formed in each of the CF substrate regions of the substrate 20 to serve as CF substrates using a printing process (step S5), and a rubbing process is performed on the same if necessary (step S6). For example, a photo curing sealing material for combining the substrates are then applied to a peripheral portion of each of the CF substrate regions using a predetermined dispenser (step S7).

Next, the substrate 10 to serve as TFT substrates having the liquid crystal dispensed in each of the TFT substrate regions thereof and the substrate 20 to serve as CF substrates having the sealing material applied in the peripheral portions of each of the CF substrate regions are aligned and overlapped with each other in a vacuum chamber (step S8). Next, the atmospheric pressure is restored in the chamber to disperse the liquid crystal between the substrates, and the sealing material is irradiated with ultraviolet rays (UV rays) to set the same, which completes the combining of the substrate 10 to serve as TFT substrates and the substrate 20 to serve as CF substrates (step S9).

The hatched block in FIG. 1 represents the operational step for applying a voltage. A process (step S10) for stabilizing the alignment of the liquid crystal using a polymer (referred to as polymer stabilization in the figure) or an aligning process (step S11) is performed on the multiplicity of liquid crystal display panel regions provided on the pair of mother glasses 10 and 20 provided opposite to each other with the liquid crystal sealed therebetween at steps S8 and S9.

The step of stabilizing the alignment of the liquid crystal using a polymer (step S10) is a step that is employed when using a liquid crystal material which is a liquid crystal having negative dielectric constant anisotropy and which includes a polymeric component that is optically or thermally polymerized (monomer or oligomer). At the step of stabilizing the alignment of the liquid crystal using a polymer (step S10), the monomer in the liquid crystal component is polymerized by irradiating the same with ultraviolet rays (UV) while applying a voltage, which stabilizes the alignment of the liquid crystal.

The aligning process step (step S11) is a step that is employed when a liquid crystal having spontaneous polarization is used. At the aligning process, the alignment of the liquid crystal is controlled by heating the same while applying a voltage.

When the liquid crystal aligning process at step S10 or S11 is completed, the process then proceeds to a display inspection step (step S12). At the display inspection step, a voltage is applied to each of pixels of the plurality of liquid crystal display panel regions formed on the pair of mother glasses to detect display defects utilizing optical responses (turning on and off) of the liquid crystal. Any liquid crystal display panel region having a display defect is given a mark indicating the fact that there is a display defect.

When the display inspection step proves that each pixel is properly turned on, the pair of mother glasses is broken along scribe lines to divide them into individual liquid crystal display panels (step S13). Next, edges of the glass substrates of the individual liquid crystal display panels thus divided are chamfered, and a process of forming a polarization film and various films for optical compensation (laminating process) is performed to complete the individual liquid crystal display panels (step S14).

A description will now be made with reference to FIGS. 2 to 5 on the combining of the substrate 10 to serve as TFT substrates and the substrate 20 to serve as CF substrates used in the method of manufacturing liquid crystal display panels in the present embodiment of the invention and on an arrangement of electrode terminals 30 and 40 for applying a manufacturing voltage. FIGS. 2 to 5 show an example of a case in which twelve liquid crystal display panel regions P are provided on a pair of mother glasses on a gang printing basis.

Figure 2:
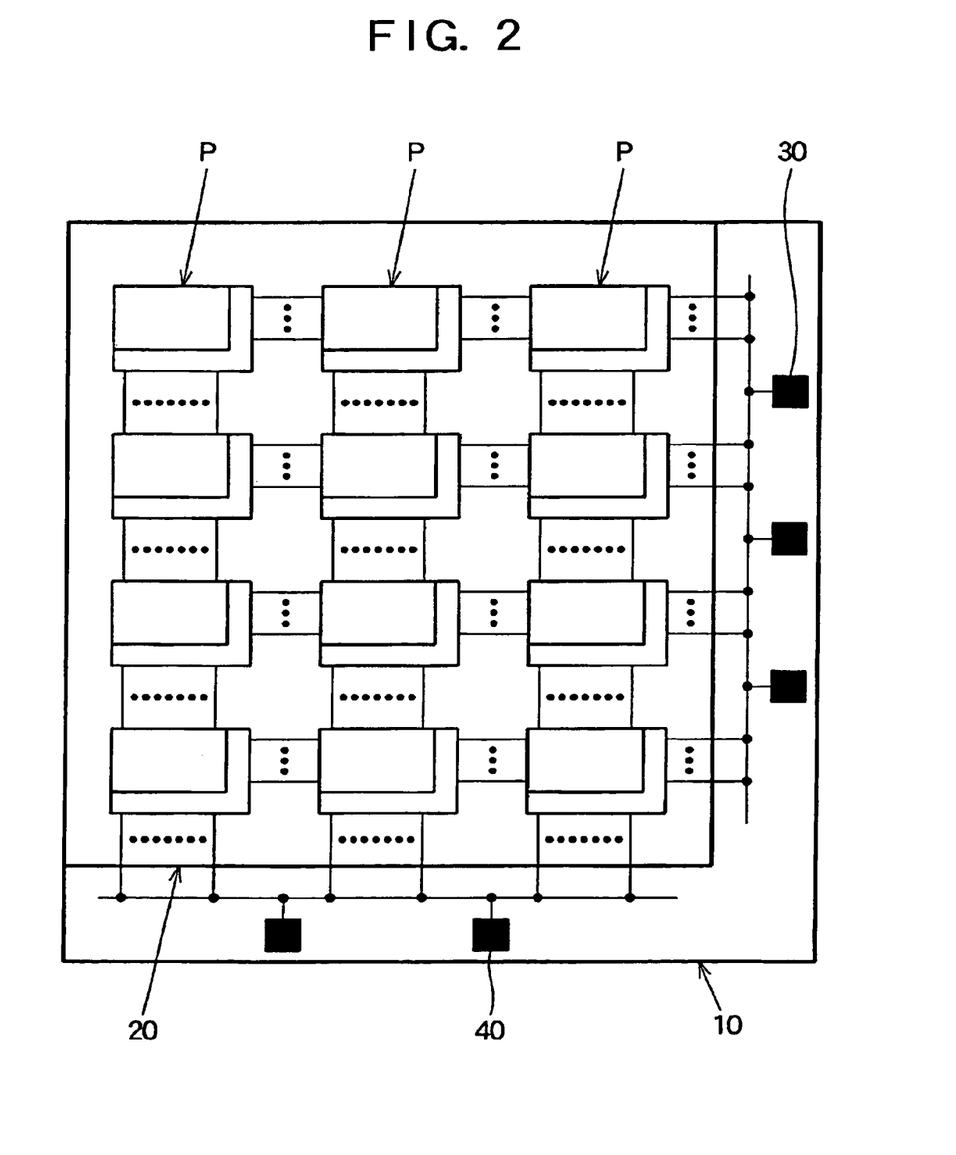
FIG. 2 shows the positions of a pair of mother glasses and the positions of electrode terminals for applying a manufacturing voltage to show an example in which two mother glasses having different sizes are combined according to the method of manufacturing liquid crystal display panels of the embodiment of the invention.

One method for exposing terminal planes having the electrode terminals 30 and 40 for applying a manufacturing voltage formed thereon is to combine mother glasses having different sizes as shown in FIG. 2. In the example in FIG. 2, terminal planes having the electrode terminals 30 and 40 for applying a manufacturing voltage formed thereon are formed along two adjoining sides of a substrate 10 to serve as TFT substrates at the periphery thereof. A substrate 20 to serve as CF substrates is formed with such a substrate size that the terminal planes of the substrate 10 to serve as TFT substrates are exposed. Thus, terminal planes having the electrode terminals 30 and 40 for applying a manufacturing voltage formed thereon can be exposed by combining two substrates having different substrate sizes.

Figure 3:
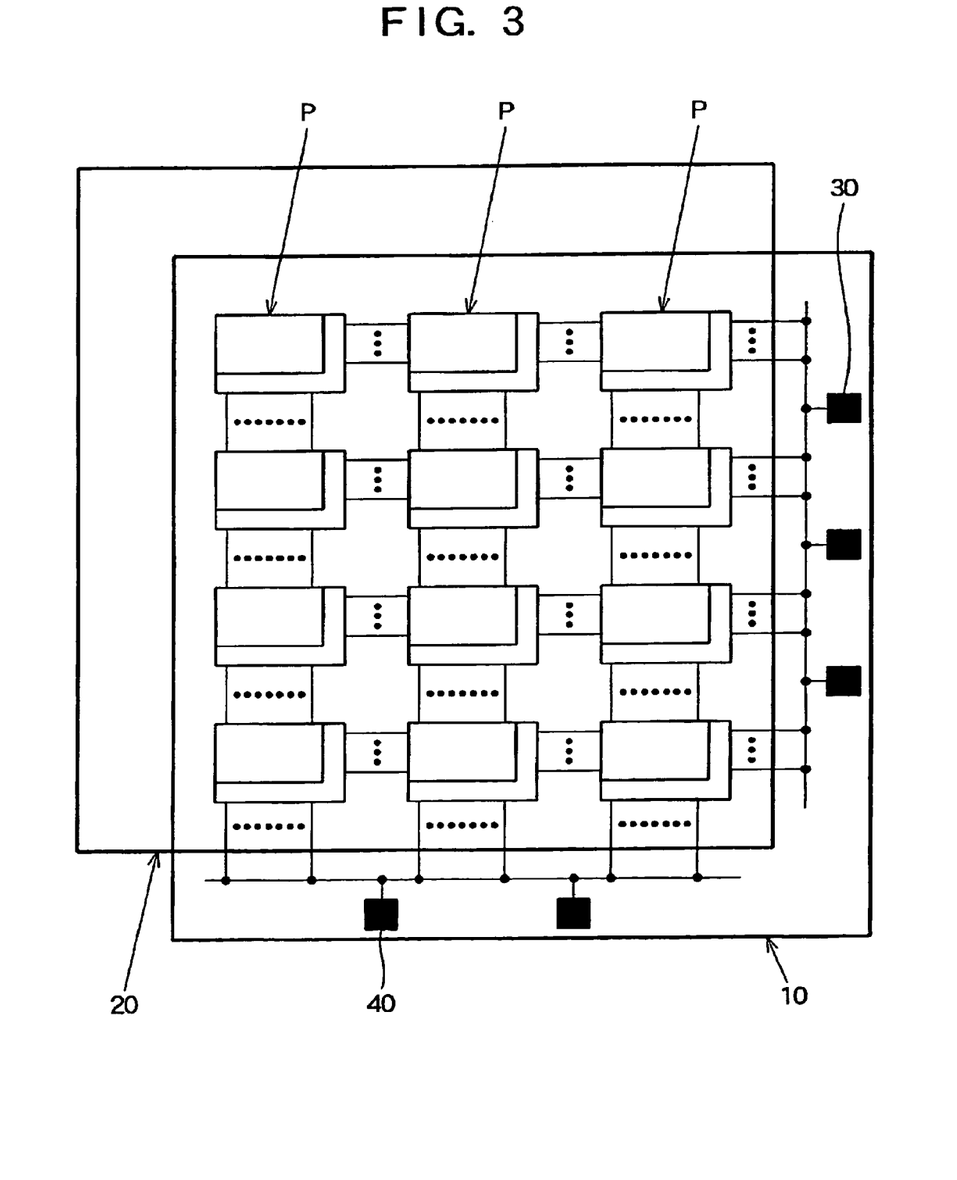
FIG. 3 shows the positions of a pair of mother glasses and the positions of electrode terminals for applying a manufacturing voltage to show an example in which mother glasses having the same size are combined with an offset according to the method of manufacturing liquid crystal display panels of the embodiment of the invention.

Alternatively, mother glasses having the same size may be combined with an offset as shown in FIG. 3. In the example shown in FIG. 3, a substrate 10 to serve as TFT substrates and a substrate 20 to serve as CF substrates have substantially the same substrate size. At substrate combining step S8 shown in FIG. 1, the substrates 10 and 20 are combined with an offset such that terminal planes for electrode terminals 30 and 40 for applying a manufacturing voltage formed on two adjoining sides of the substrate 10 to serve as TFT substrates are exposed. This makes it possible to expose the terminal planes on which the electrode terminals 30 and 40 for applying a manufacturing voltage are formed.

Figure 4:
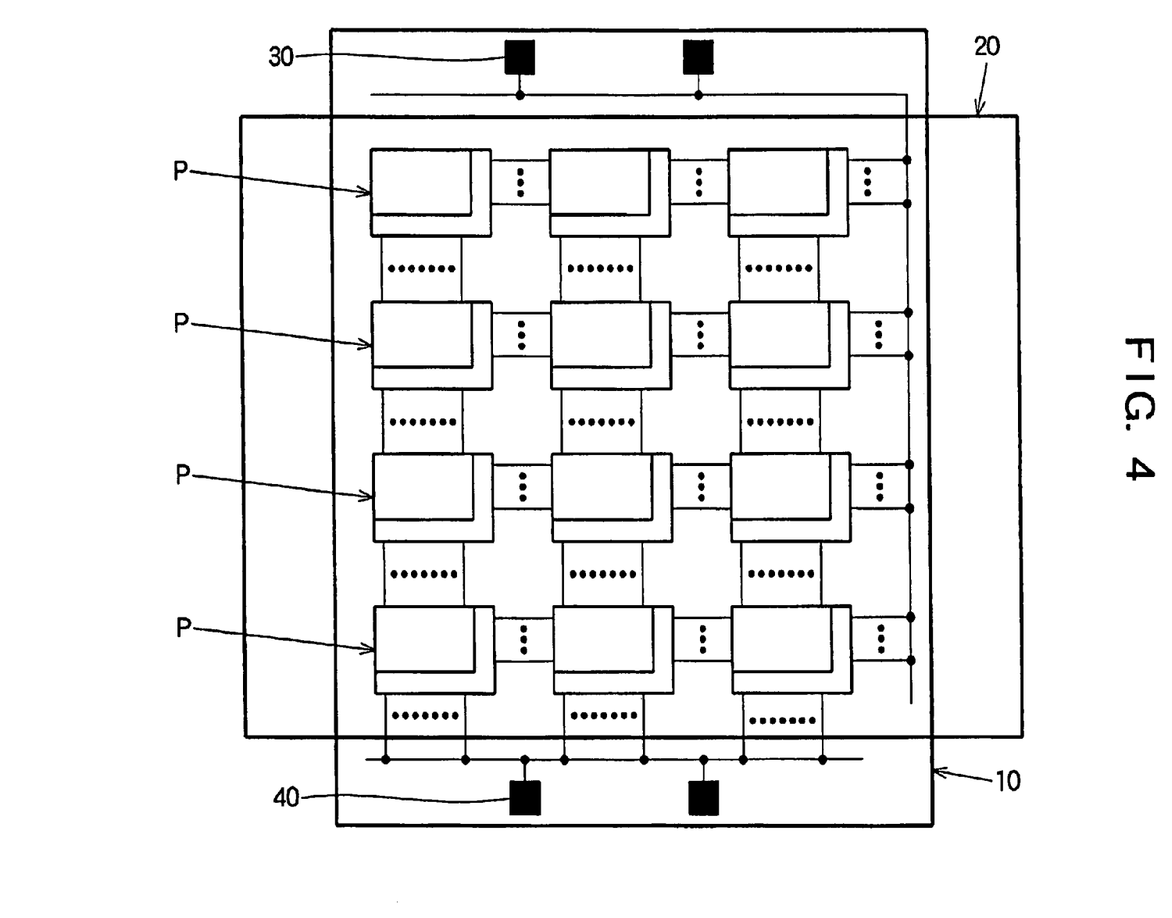
FIG. 4 shows the positions of a pair of mother glasses and the positions of electrode terminals for applying a manufacturing voltage to show an example in which mother glasses having the same size or different sizes are combined at different orientations according to the method of manufacturing liquid crystal display panels of the embodiment of the invention.

Alternatively, two mother glasses each having different longitudinal and transverse dimensions may be used, and the mother glasses may be combined at different orientations, as shown in FIG. 4. In the example shown in FIG. 4, a substrate 10 to serve as TFT substrates and a substrate 20 to serve as CF substrates have substantially the same substrate size and have rectangular configurations each having different longitudinal and transverse dimensions. Terminal planes having electrode terminals 30 and 40 for applying a manufacturing voltage formed thereon are formed along two opposite sides of the substrate 10 to serve as TFT substrates at the periphery thereof. When the substrates are combined at step S8 shown in FIG. 1, they are combined with the substrate 20 to serve as CF substrates rotated at substantially 90 deg. so as to expose the terminal planes for the electrode terminals 30 and 40 for applying a manufacturing voltage formed along the two opposite sides of the substrate 10 to serve as TFT substrates at the periphery thereof. This makes it possible to expose the terminal planes on which the electrode terminals 30 and 40 for applying a manufacturing voltage are formed. Obviously, TFT substrate regions formed on the substrate 10 to serve as TFT substrates and CF substrate regions formed on the substrate 20 to serve as CF substrates are patterned such that the substrates will stay in a predetermined range of alignment when combined in each of the examples shown in FIGS. 2 to 4.

Figure 5:
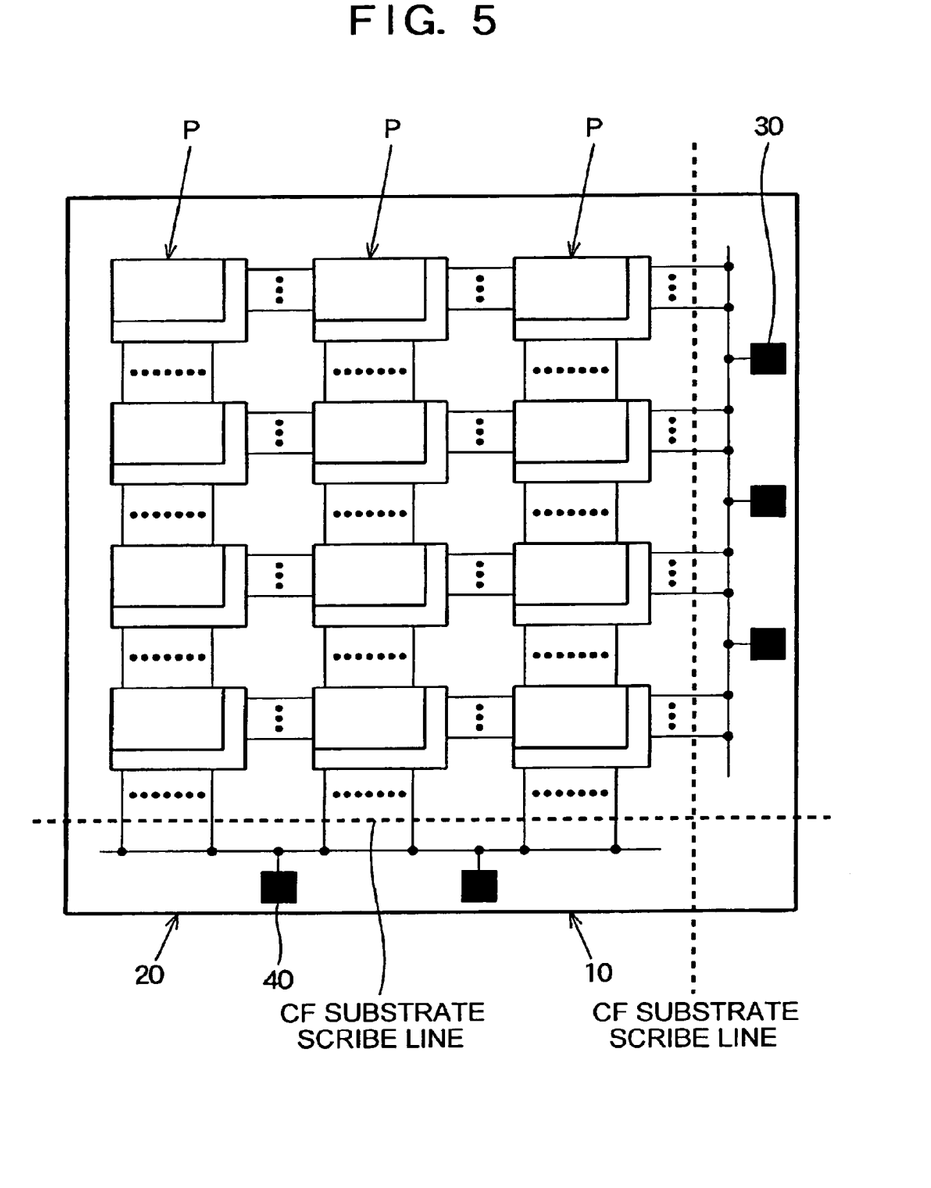
FIG. 5 shows the positions of a pair of mother glasses and the positions of electrode terminals for applying a manufacturing voltage to show an example in which mother glasses having same sizes are combined and in which one of the mother glasses is cut thereafter according to the method of manufacturing liquid crystal display panels of the embodiment of the invention.

Alternatively, after a substrate 10 to serve as TFT substrates and a substrate 20 to serve as CF substrates having the same size are combined with their edges aligned with each other, the substrate 20 to serve as CF substrates may be cut and eliminated from terminal planes so as to expose terminal planes for electrode terminals 30 and 40 for applying a manufacturing voltage formed along two adjoining sides of the substrate 10 to serve as TFT substrates at the periphery thereof, as shown in FIG. 5. This makes it possible to expose the terminal planes on which the electrode terminals 30 and 40 for applying a manufacturing voltage are formed.

A description will now be made with reference to FIGS. 6 to 8 on a method of applying a voltage used in the method of manufacturing liquid crystal display panels in the present embodiment of the invention. A voltage is applied by exposing the terminal planes as described above and probing the electrode terminals 30 and 40 for applying a manufacturing voltage on the terminal planes with microscopic needles (probe pins). The voltage application terminals for applying a voltage may be the electrode terminals 30 and 40 for applying a manufacturing voltage as common electrode pads that are provided in advance. Alternatively, they may be terminals that are actually packaged on a TAB or COG basis.

Figure 6:
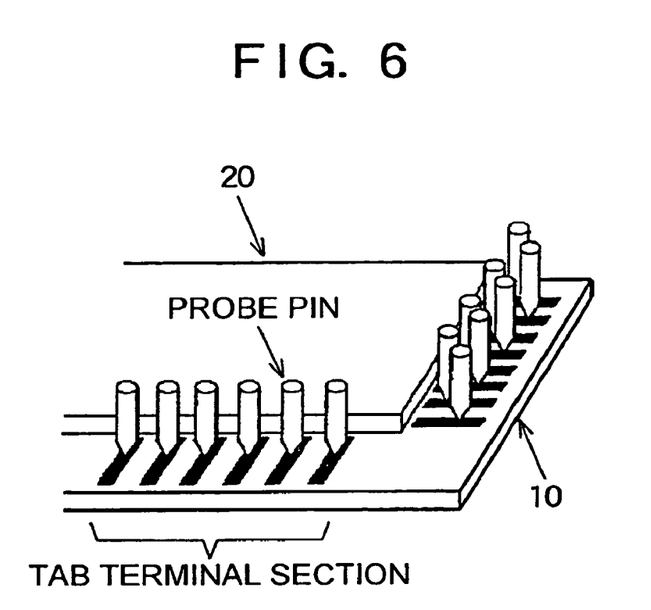
FIG. 6 illustrates how to apply a voltage using a TAB terminal section according to the method of manufacturing liquid crystal display panels of the embodiment of the invention.

FIG. 6 shows an example in which a voltage is applied by putting probe pins in contact with terminal sections provided on a TAB basis. In this case, since the probe pins must be provided in association with the respective terminals, a great number of probe pins are required to apply a voltage to all of the terminals.

Figure 7:
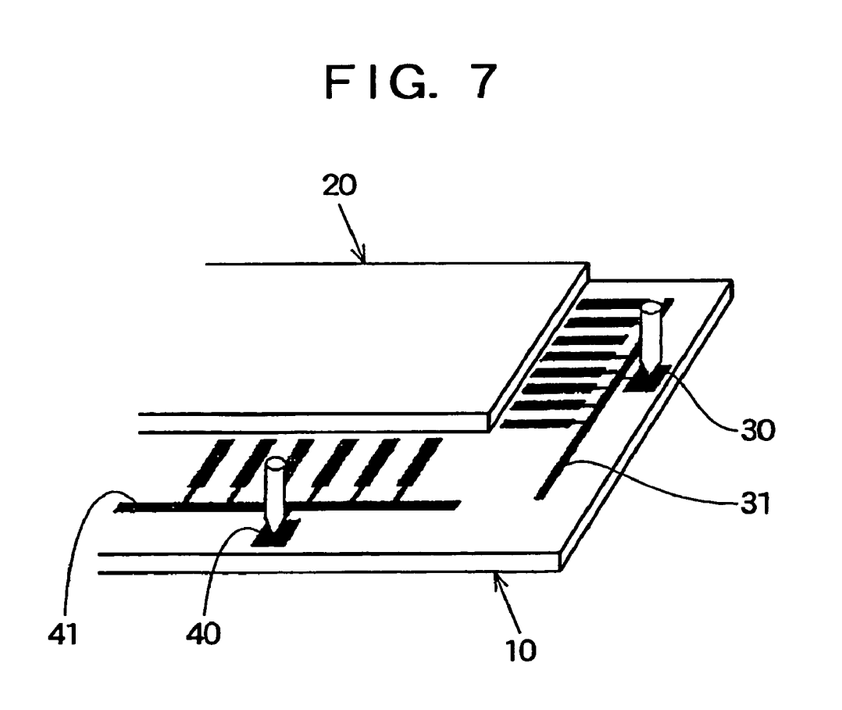
FIG. 7 illustrates how to apply a voltage using a common electrode terminal according to the method of manufacturing liquid crystal display panels of the embodiment of the invention.

FIG. 7 shows an example in which a voltage is applied by putting probe pins in contact with the respective electrode terminals 30 and 40 for applying a manufacturing voltage. Each of electrodes extended from scan bus lines formed on a substrate 10 to serve as TFT substrates is connected to a common electrode 31 for the scan bus lines at an end thereof. Therefore, a voltage can be applied to all of the scan bus lines by applying the voltage to the electrode terminals 30 for applying a manufacturing voltage for the scan bus lines through probe pins. Similarly, each of electrodes extended from signal bus lines formed on the substrate 10 to serve as TFT substrates is connected to a common electrode 41 for the signal bus line at an end thereof. Therefore, a voltage can be applied to all of the signal bus lines by applying the voltage to the electrode terminals 40 for applying a manufacturing voltage for the signal bus lines through probe pins.

Figure 8:
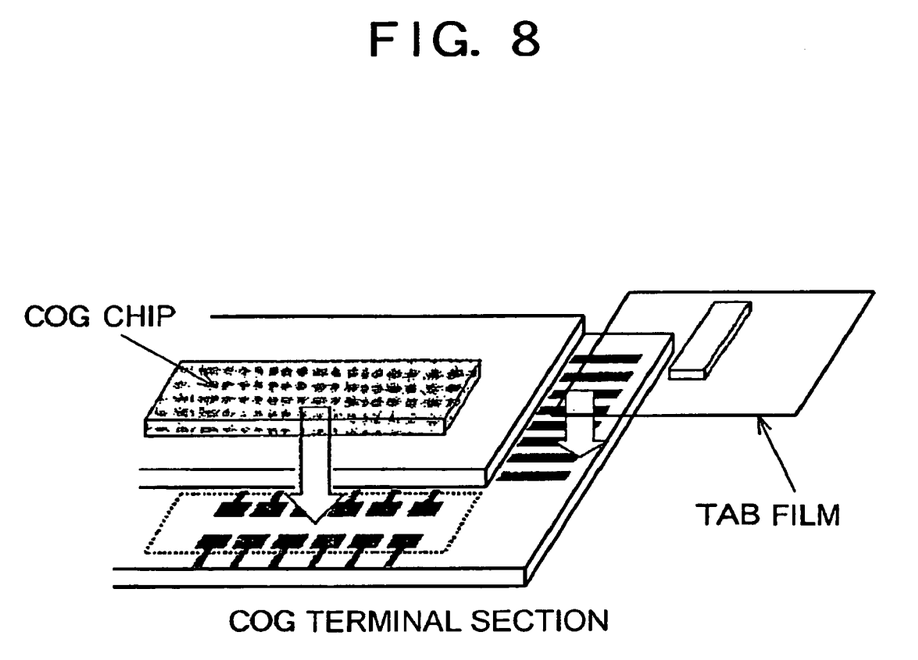
FIG. 8 illustrates how to apply a voltage using TAB packaging or COG packaging according to the method of manufacturing liquid crystal display panels of the embodiment of the invention.

FIG. 8 shows an example in which a voltage is directly applied to COG terminal sections and TAB terminal sections by packaging them on a TAB or COG basis without using probe pins. When an array inspection apparatus capable of determining whether an electrical circuit is good or not is used for a substrate 10 to serve as TFT substrates which has not been combined with a substrate 20 to serve as CF substrates yet, no voltage can be supplied from a common connection line because a highly resistive element is required between each bus line terminal and a common electrode section according to the principle of measurement with an array inspection apparatus. A voltage can be supplied even in such a case by probing TAB-packaged sections. Alternatively, a voltage can be directly supplied by using TAB packaging or COG packaging instead of probing.

Figure 9:
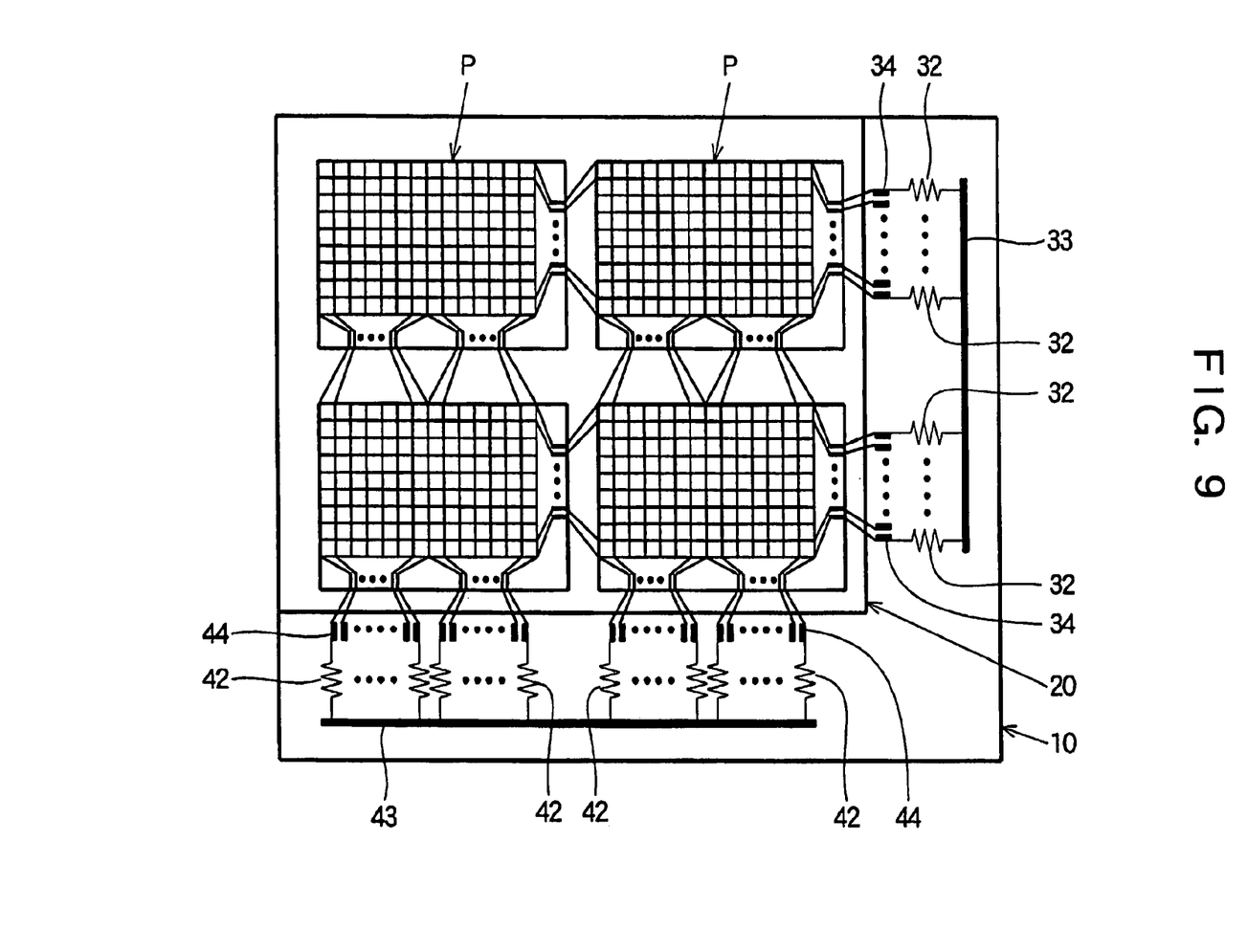
FIG. 9 shows a configuration for connecting bus lines between adjoining LCD panel regions P and extracting the bus lines in adaptation to an array inspection according to the method of manufacturing liquid crystal display panels of the embodiment of the invention.
Figure 10:
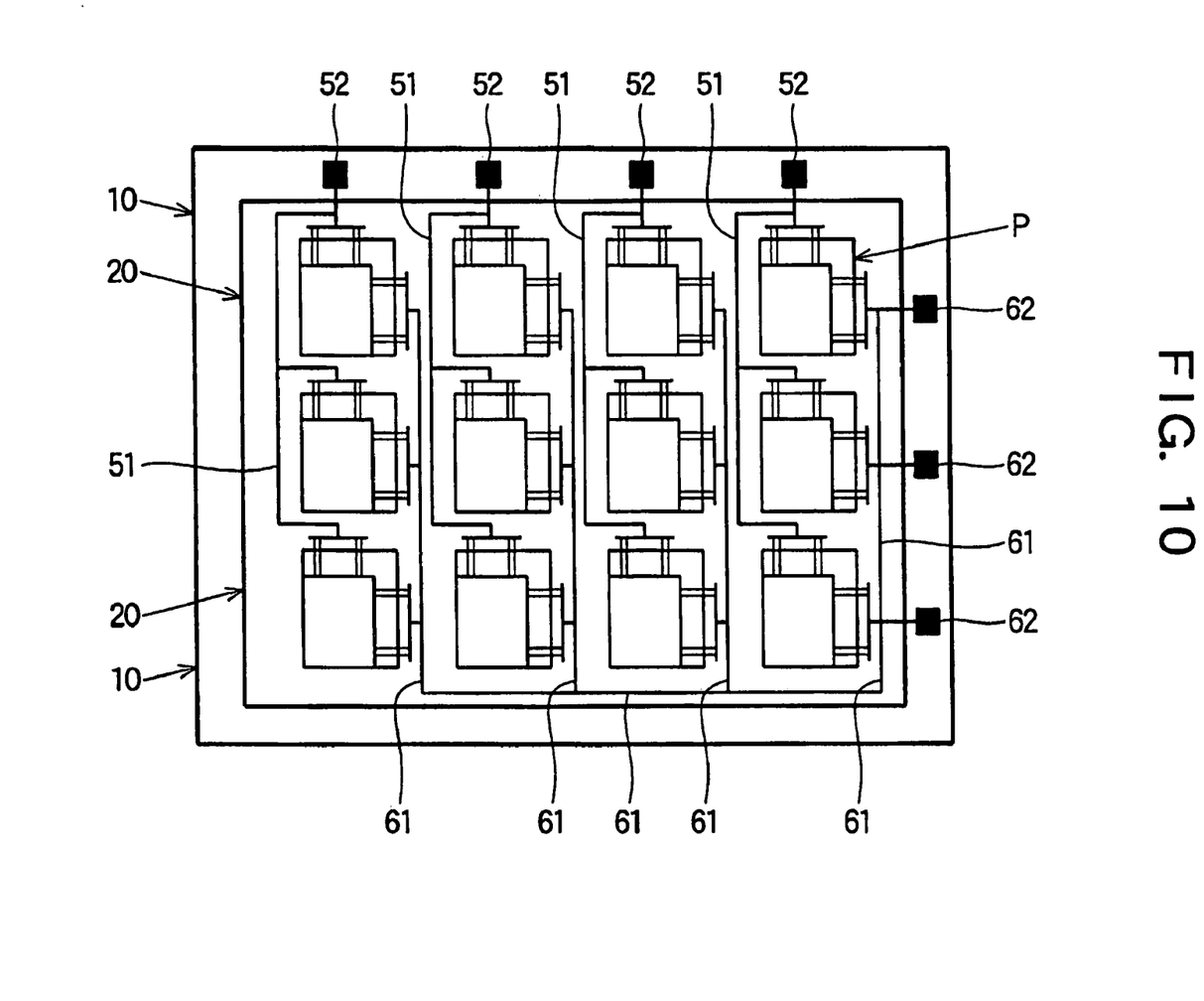
FIG. 10 shows a configuration for connecting bus lines between adjoining LCD panel regions P and extracting bus lines from a gang-printed mother glass for which no array inspection is required according to the method of manufacturing liquid crystal display panels of the embodiment of the invention.

FIGS. 9 and 10 show connection of bus lines between LCD panel regions adjacent to each other. In the case of a gang-printed product in which a plurality of LCD panel regions are provided on a pair of mother glasses, terminal sections for applying a voltage are located inward, which makes it difficult to apply a voltage to each of the LCD panel regions. In this case, scan bus lines and signal bus lines of the LCD panel regions may be connected to each other to apply a voltage to all of the LCD panel regions, as shown in FIGS. 9 and 10.

FIG. 9 shows a configuration for extracting bus lines in adaptation to an array inspection. Scan bus lines of LCD panel regions P adjacent to each other in the horizontal direction in FIG. 9 are connected to each other, and each of the scan bus lines of the LCD panel regions P on the right end in FIG. 9 is electrically connected to a scan bus line common electrode wiring 33 through an inspection resistor 32. A TAB terminal 34 for extracting voltage information for the array inspection is provided at one end of an inspection resistor 32. Signal bus lines of LCD panel regions P adjacent to each other in the vertical direction in FIG. 9 are connected to each other, and each of the signal bus lines of the LCD panel regions at the bottom in FIG. 9 is electrically connected to a signal bus line common electrode wiring 43 through an inspection resistor 42. A TAB terminal 44 for extracting voltage information for the array inspection is provided at one end of an inspection resistor 42.

An array inspection can be conducted because the bus lines are connected to the common electrode wirings 33 and 43 provided at ends of the substrates through the inspection resistors having a predetermined resistance. During the array inspection, TFTs that are switching elements are turned on to write a charge in each of pixels in the LCD panel regions P, thereby charging a pixel capacitance and an auxiliary capacitance at each pixel. Thereafter, the TFTs are turned off to read the charge that has been written in each pixel. Specifically, a voltage generated across the inspection resistors 32 and 42 is detected through an operational amplifier. This makes it possible to detect the presence of a defect at each pixel. However, since the bus lines of adjoining LCD panel regions P are connected to each other in the gang printing mode, a plurality of LCD panel regions P are inspected as a single LCD panel region.

When the LCD panel regions P are cut to provide individual LCD panels, electrode wirings(electrode metals) at bus line connecting sections between the LCD panel regions P (electrode connecting wirings between the LCD panel regions P) are exposed at the cutting positions. A panel structure having high anti-corrosion properties can be provided by bridge-connecting the electrodes between the LCD panel regions P using ITO (indium tin oxide) that is a transparent electrode material. Since this makes it possible to apply a voltage to the plurality of LCD panel regions P provided on the pair of mother glasses at a time before the cutting (scribing and breaking) step, inspection man-hour can be reduced.

FIG. 10 shows a configuration for extracting bus lines from a gang-printed substrate for which no array inspection is required. In the case of a gang-printed substrate requiring no array inspection, scan bus lines of each display panel are connected to a terminal 52 for applying a voltage for the scan bus lines through a scan bus line common wiring 51, and signal bas lines of each LCD panel region P are connected to a terminal 62 for applying a voltage for the signal bus lines through a signal bus line common wiring 61. The voltage application terminals 52 and 62 are provided and exposed at an end of the mother glass. While FIG. 10 shows an example in which the terminals 52 for applying a voltage for the scan bus lines are provided in four locations and in which the terminals 62 for applying a voltage for the signal bus lines are provided in three locations, each of the voltage application terminals 52 and 62 may be provided in one location.

Figure 11:
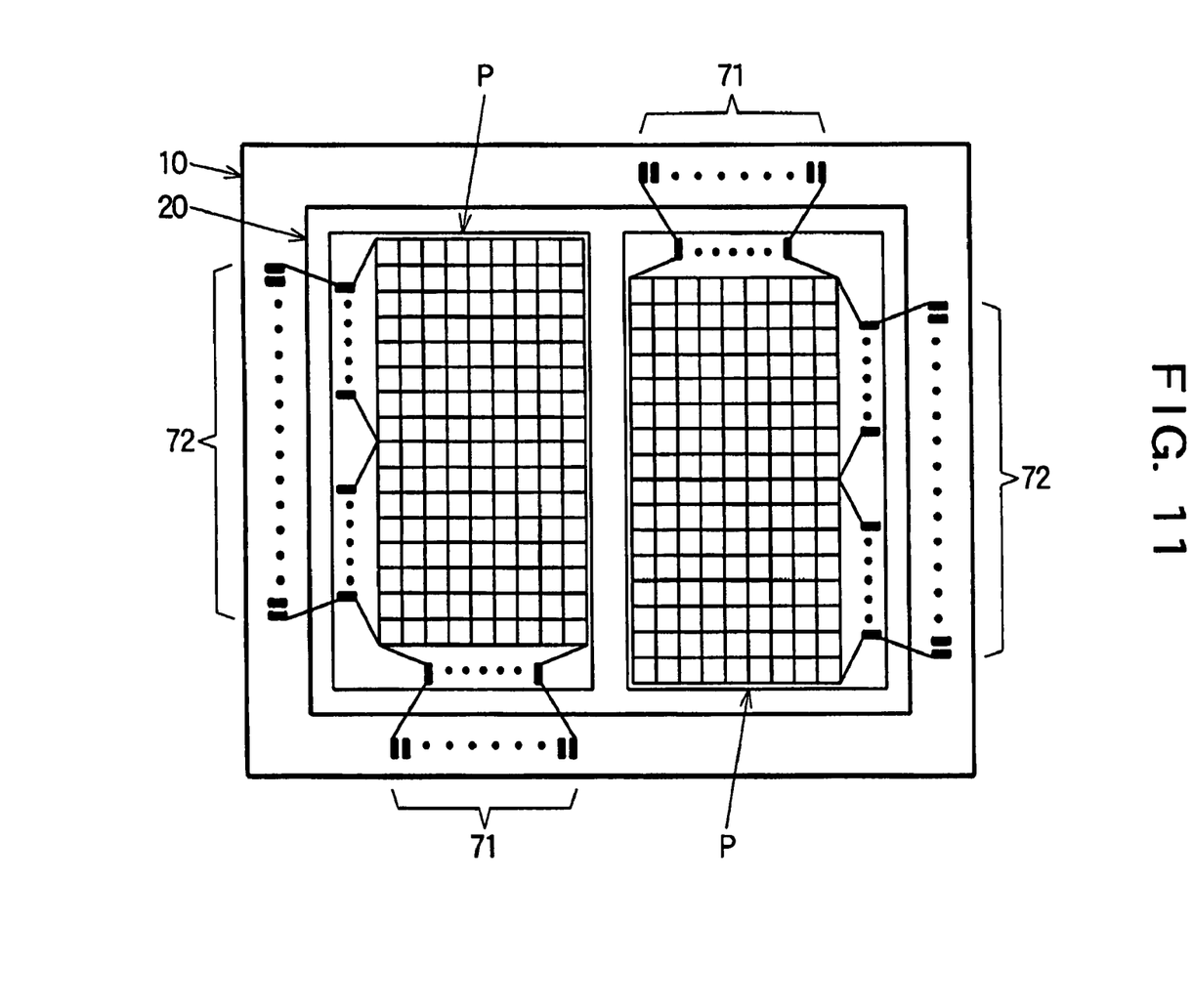
FIG. 11 shows an example in which two LCD panel regions P are provided such that they are rotated 180 deg. from each other according to the method of manufacturing liquid crystal display panels of the embodiment of the invention.
Figure 12:
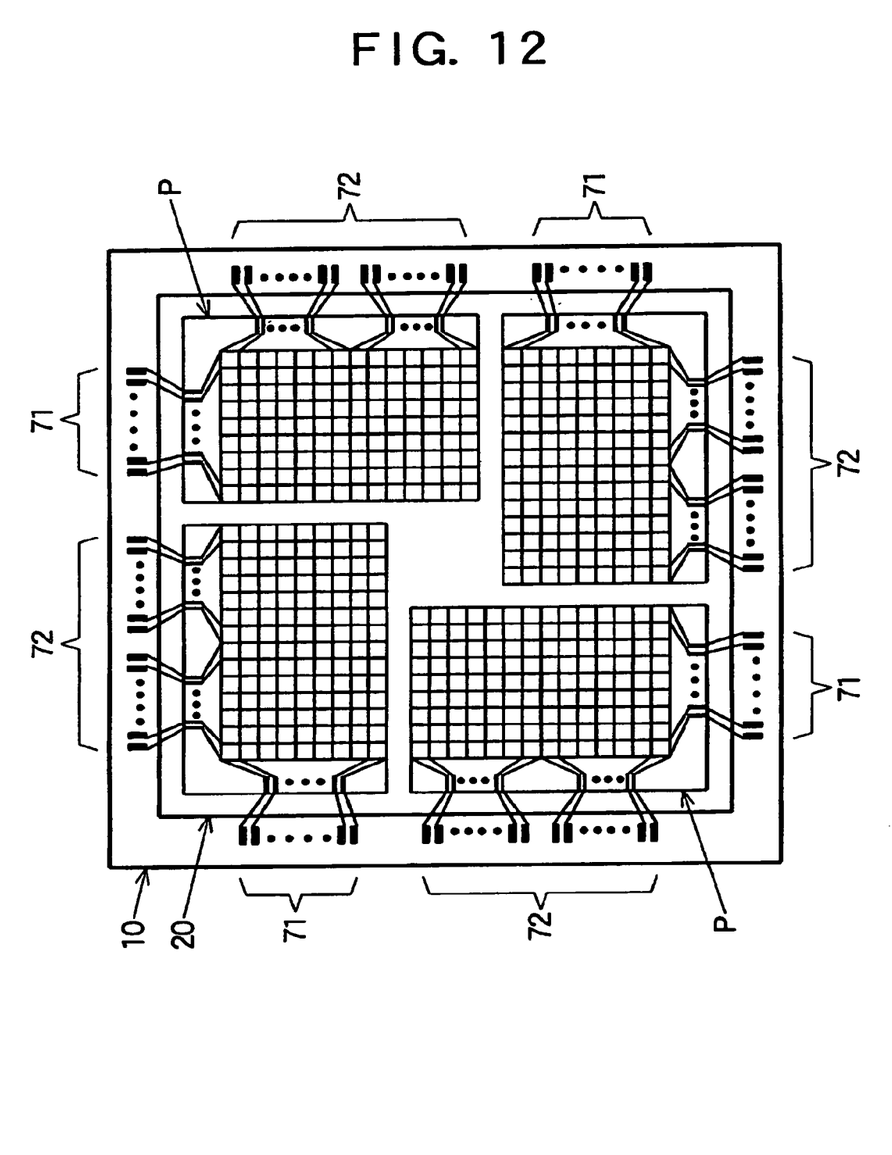
FIG. 12 shows an example in which four LCD panel regions P are provided such that one panel region is rotated 90 deg. from another according to the method of manufacturing liquid crystal display panels of the embodiment of the invention.

FIG. 11 shows an example in which two LCD panel regions P are provided such that they are rotated 180 deg. from each other. FIG. 12 shows an example in which four LCD panel regions P are provided such that one panel region is rotated 90 deg. from another. When the number of panels obtained from a single substrate is four or less and each LCD panel region P has voltage application terminals on two or less sides thereof, the voltage applying sections of the LCD panel regions P can be located in peripheral regions of the mother glass by providing the LCD panel regions P at different orientations.

When two LCD panels are provided on a gang printing basis as shown in FIG. 11, terminal sections 71 and 72 for applying a voltage can be located in peripheral regions of the mother glass by providing the LCD panel regions P such that they are rotated 180 deg. from each other.

When four LCD panels are provided on a gang printing basis as shown in FIG. 12, terminal sections 71 and 72 for applying a voltage can be located in peripheral regions of the mother glass by providing the LCD panel regions P such that one panel region is rotated 90 deg. from another.

While FIGS. 11 and 12 show examples in which all of terminals for scan bus lines and all of terminals for signal bus lines are extended to peripheral regions of a mother glass, a configuration may be employed in which the scan bus lines are connected to each other through a common electrode wiring; one or more common electrode pads for the scan bus lines (electrode terminals for applying a manufacturing voltage) are provided; the signal bus lines are connected to each other through a common electrode wiring; and one or more common electrode pads for the signal bus lines are provided, as shown in FIGS. 2 to 5 and FIG. 7.

The invention is not limited to the above-described embodiment and may be modified in various ways.

For example, while the above embodiment has been described with reference to examples in which a glass substrate is used as a substrate for gang printing, this is not limiting the invention, and an insulated substrate made of plastic may be used.

While the above embodiment has been described with reference to transmissive liquid crystal displays as examples, the invention is not limited to the same and may obviously applied to reflective liquid crystal displays and transflective liquid crystal displays.

As described above, the method of manufacturing liquid crystal display panels according to the invention makes it possible to perform an inspection required for forming liquid crystal display panel cells or a step of stabilizing alignment of a liquid crystal utilizing a polymer or an aligning step before cutting the substrates. It is therefore possible to reduce the time required for a voltage applying step and to achieve a reduction of the manufacturing cost.

What is claimed is:

1. A method of manufacturing liquid crystal display panels comprising the steps of:
   dispensing a liquid crystal in a predetermined quantity on a first substrate for gang printing;
   combining a second substrate with the first substrate on which the liquid crystal has been dispensed to form a multiplicity of liquid crystal display panel regions; and
   applying a predetermined voltage to the liquid crystal display panel regions from an electrode terminal provided on the first or second substrate prior to a step of dividing the pair of first and second substrate thus combined into individual liquid crystal display panels,
   wherein the step of applying a voltage includes the steps of:
   electrically connecting scan bus lines in the multiplicity of liquid crystal display panel regions to each other;
   electrically connecting signal bus lines in the multiplicity of liquid crystal display panel regions to each other;
   connecting each of the mutually connected scan bus lines to an electrode terminal for the scan bus lines through a predetermined resistor;
   connecting each of the mutually connected signal bus lines to an electrode terminal for the signal bus lines through a predetermined resistor; and
   applying a voltage to each of the terminals.

2. A method of manufacturing liquid crystal display panels according to claim 1, wherein the step of applying a voltage includes the step of inspecting display defects in the liquid crystal display panel regions.

3. A method of manufacturing liquid crystal display panels according to claim 1, wherein the step of applying a voltage includes the step of irradiating the liquid crystal with ultraviolet rays while applying a voltage to polymerize a monomer in the liquid crystal component.

4. A method of manufacturing liquid crystal display panels according to claim 1, wherein the step of applying a voltage includes the step of controlling alignment of the liquid crystal by heating the liquid crystal while applying a voltage.

5. A method of manufacturing liquid crystal display panels according to claim 1, further comprising a step of exposing a terminal plane of the electrode terminal provided on the first or second substrate.

6. A method of manufacturing liquid crystal display panels according to claim 5, wherein the first and second substrates are offset relative to each other such that the terminal plane is exposed at the step of exposing the terminal plane.

7. A method of manufacturing liquid crystal display panels according to claim 5, wherein a substrate region facing the terminal plane is cut after the first and second substrates are combined such that the terminal plane is exposed at the step of exposing the terminal plane.

8. A method of manufacturing liquid crystal display panels according to claim 5, wherein the first and second substrates having different substrate sizes are combined such that the terminal plane is exposed at the step of exposing the terminal plane.

9. A method of manufacturing liquid crystal display panels according to claim 1, wherein a voltage is applied to the electrode terminal that has been packaged on a TAB or COG basis at the step of applying a voltage.

10. A method of manufacturing liquid crystal display panels comprising the steps of:
dispensing a liquid crystal in a predetermined quantity on a first substrate for gang printing;
combining a second substrate with the first substrate on which the liquid crystal has been dispensed to form a multiplicity of liquid crystal display panel regions; and
applying a predetermined voltage to the liquid crystal display panel regions from an electrode terminal provided on the first or second substrate prior to a step of dividing the pair of first and second substrate thus combined into individual liquid crystal display panels,
wherein the step of applying a voltage includes the steps of:
connecting scan bus lines in the multiplicity of liquid crystal display panel regions to an electrode terminal for the scan bus lines directly;
connecting signal bus lines in the multiplicity of liquid crystal display panel regions to an electrode terminal for the signal bus lines directly; and
applying a voltage to each of the terminals.

11. A method of manufacturing liquid crystal display panels according to claim 1, wherein the multiplicity of liquid crystal display panel regions are provided such that they are rotated at a predetermined angle to each other.

12. A method of manufacturing liquid crystal display panels according to claim 10, wherein the step of applying a voltage includes the step of inspecting display defects in the liquid crystal display panel regions.

13. A method of manufacturing liquid crystal display panels according to claim 10, wherein the step of applying a voltage includes the step of irradiating the liquid crystal with ultraviolet rays while applying a voltage to polymerize a monomer in the liquid crystal component.

14. A method of manufacturing liquid crystal display panels according to claim 10, wherein the step of applying a voltage includes the step of controlling alignment of the liquid crystal by heating the liquid crystal while applying a voltage.

15. A method of manufacturing liquid crystal display panels according to claim 10, further comprising a step of exposing a terminal plane of the electrode terminal provided on the first or second substrate.

16. A method of manufacturing liquid crystal display panels according to claim 15, wherein the first and second substrates are offset relative to each other such that the terminal plane is exposed at the step of exposing the terminal plane.

17. A method of manufacturing liquid crystal display panels according to claim 15, wherein a substrate region facing the terminal plane is cut after the first and second substrates are combined such that the terminal plane is exposed at the step of exposing the terminal plane.

18. A method of manufacturing liquid crystal display panels according to claim 15, wherein the first and second substrates having different substrate sizes are combined such that the terminal plane is exposed at the step of exposing the terminal plane.

19. A method of manufacturing liquid crystal display panels according to claim 10, wherein a voltage is applied to the electrode terminal that has been packaged on a TAB or COG basis at the step of applying a voltage.

20. A method of manufacturing liquid crystal display panels according to claim 10, wherein the multiplicity of liquid crystal display panel regions are provided such that they are rotated at a predetermined angle to each other.

* * * * *